United States Patent
Morin et al.

(10) Patent No.: US 9,890,865 B2
(45) Date of Patent: Feb. 13, 2018

(54) FLOW CONTROL SYSTEM HAVING A PLANETARY GEAR SET

(71) Applicant: Cameron International Corporation, Houston, TX (US)

(72) Inventors: Jesse Morin, Westbrook, ME (US); James Keith Pierrotti, Limington, ME (US)

(73) Assignee: Cameron International Corporation, Houston, TX (US)

( * ) Notice: Subject to any disclaimer, the term of this patent is extended or adjusted under 35 U.S.C. 154(b) by 175 days.

(21) Appl. No.: 14/687,636

(22) Filed: Apr. 15, 2015

(65) Prior Publication Data

US 2016/0305563 A1    Oct. 20, 2016

(51) Int. Cl.

| | |
|---|---|
| F16K 17/36 | (2006.01) |
| F16K 31/53 | (2006.01) |
| F16K 31/54 | (2006.01) |
| F16K 31/02 | (2006.01) |
| F16K 31/10 | (2006.01) |
| F16K 31/56 | (2006.01) |

(52) U.S. Cl.
CPC .............. *F16K 17/36* (2013.01); *F16K 31/02* (2013.01); *F16K 31/10* (2013.01); *F16K 31/535* (2013.01); *F16K 31/54* (2013.01); *F16K 31/56* (2013.01)

(58) Field of Classification Search
CPC .......... F16K 17/36; F16K 31/56; F16K 31/02; F16K 31/10; F16K 31/535; F16K 31/54
USPC ..................................... 251/68–71, 248, 250
See application file for complete search history.

(56) References Cited

U.S. PATENT DOCUMENTS

| | | | | |
|---|---|---|---|---|
| 3,685,790 A | * | 8/1972 | Crowe ................... | F16K 31/003 251/67 |
| 4,113,063 A | * | 9/1978 | Troy .......................... | F03G 1/08 185/40 R |
| 4,261,224 A | * | 4/1981 | Sulzer ................... | F16D 41/088 192/223.2 |
| 4,570,903 A | * | 2/1986 | Crass ................... | F16K 37/0083 251/129.03 |
| 4,669,578 A | * | 6/1987 | Fukamachi ........... | F16K 31/043 185/40 R |

(Continued)

FOREIGN PATENT DOCUMENTS

FR    3001274 A1    7/2014

OTHER PUBLICATIONS

PCT International Search Report and Written Opinion; Application No. PCT/US2016/019655; dated Jun. 7, 2016; 12 pages.

*Primary Examiner* — Jessica Cahill
*Assistant Examiner* — Daphne M Barry
(74) *Attorney, Agent, or Firm* — Fletcher Yoder, P.C.

(57) ABSTRACT

A system including a flow control system, including a flow control mechanism configured to control a flow of fluid through a fluid passage, a rack and pinion system coupled to the flow control mechanism and configured to transfer motion from an actuator to the flow control mechanism, a biasing element coupled to the rack and pinion system, wherein the biasing element is configured to store potential energy as the flow control mechanism transitions from a closed position to an open position or an open position to a closed position, and a failsafe device configured to release the potential energy stored in the biasing element to open or close the flow control mechanism.

24 Claims, 5 Drawing Sheets

(56) References Cited

U.S. PATENT DOCUMENTS

| | | | | |
|---|---|---|---|---|
| 4,759,224 | A * | 7/1988 | Charbonneau | F16K 37/0083 137/552 |
| 6,953,084 | B2 * | 10/2005 | Greeb | E21B 34/02 166/332.1 |
| 7,377,479 | B1 * | 5/2008 | Chen | F16K 5/0647 251/129.11 |
| 7,650,905 | B2 * | 1/2010 | Kubota | F16K 31/1635 137/554 |
| 8,382,621 | B2 * | 2/2013 | Chen | F16K 31/05 475/4 |
| 2004/0134665 | A1 | 7/2004 | Greeb et al. | |

\* cited by examiner

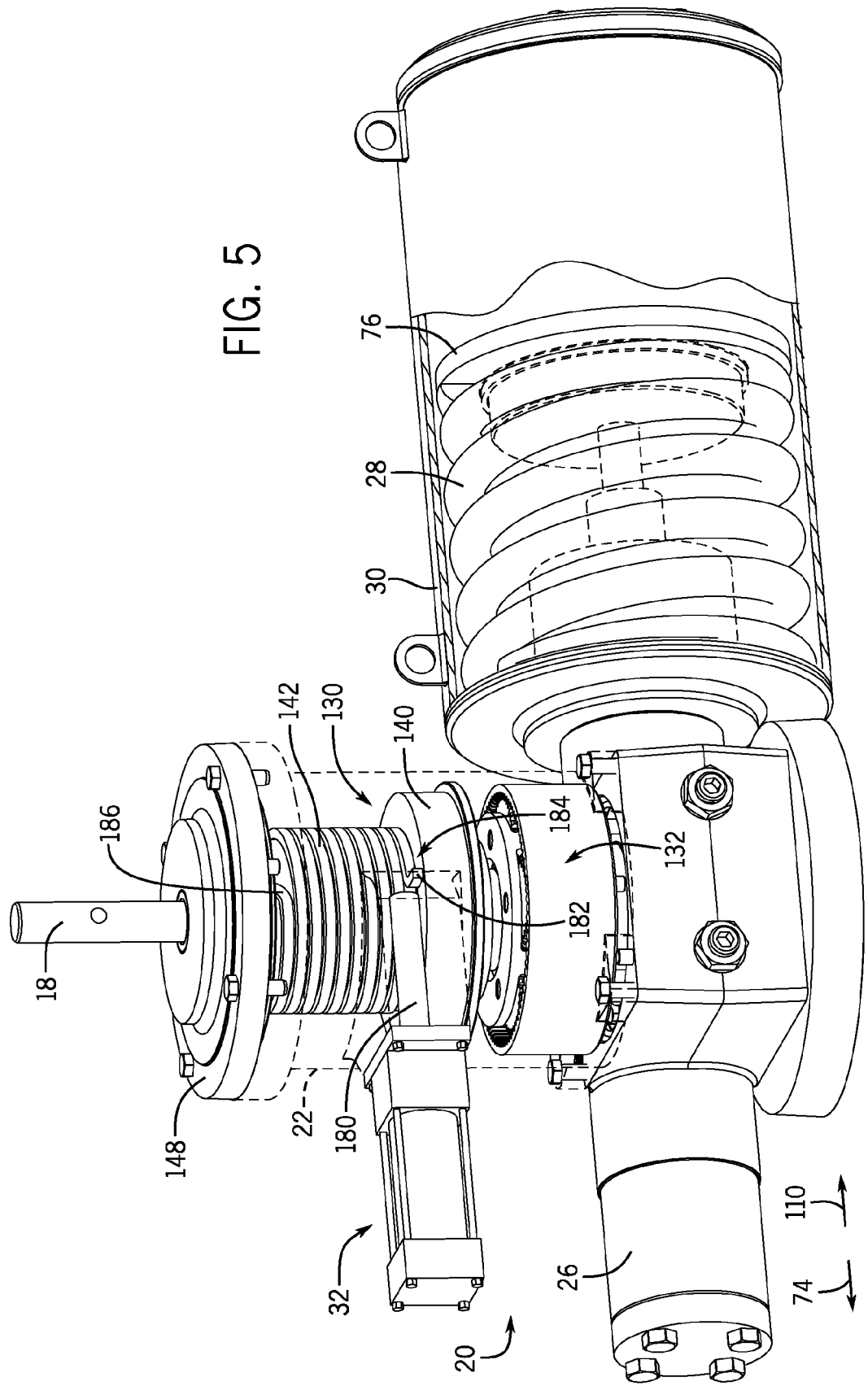

FLOW CONTROL SYSTEM HAVING A PLANETARY GEAR SET

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

The many industries use a variety of flow control devices (e.g., valves) to control fluid (e.g., oil or natural gas) flow in hydrocarbon extraction operations. These flow control devices may control pressure and fluid flow through pipes, as the hydrocarbons move within a processing plant, an oil rig, etc. These flow control devices may also include a failsafe that automatically closes the flow control device in certain circumstances (e.g., an emergency).

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 5 is a partial perspective view of an embodiment of a flow control system.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Hydrocarbon extraction and processing systems use a variety of flow control systems/devices (e.g., valves, dampers) to control fluid flow (e.g., oil or natural gas). Accordingly, these flow control systems may control pressure and fluid flow through various hydrocarbon processes. In certain circumstances, the flow control system may be opened or closed quickly (e.g., in an emergency) to allow or block/limit the flow of hydrocarbons or other fluids through various systems. In order to open or close these valves quickly, the flow control system may include a failsafe device. As will be discussed below, the disclosed embodiments include a flow control system capable of opening or closing a flow control mechanism (e.g., valve, damper, etc.) without the use of hydraulics. Indeed, the disclosed embodiments disclose a flow control system with a failsafe device that mechanically opens or closes a valve by releasing potential energy stored in a spring.

Figure 1:
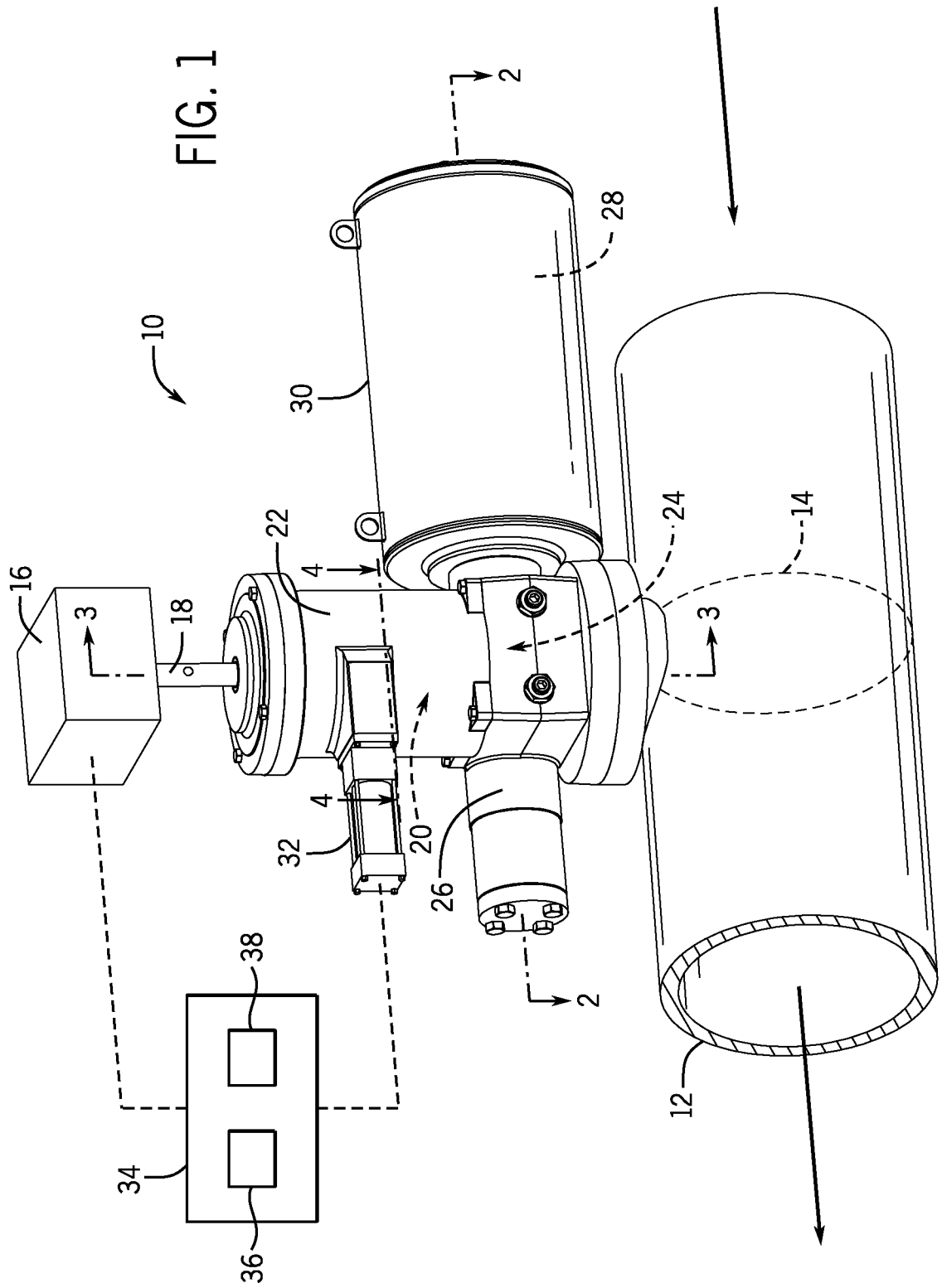
FIG. 1 is a perspective view of an embodiment of a flow control system.

FIG. 1 is a perspective view of an embodiment of a flow control system 10. In operation, the flow control system 10 controls the flow of fluids (e.g., hydrocarbons) through a tubular 12 using a flow control mechanism 14 (e.g., butterfly valve, quarter turn valve, ball valve, damper, etc.). The flow control system 10 actuates the flow control mechanism 14 using a manual or automatic actuator 16 (e.g., hand wheel, electric motor, etc.) that rotates an input shaft 18. More specifically, in the illustrated embodiment, as the input shaft 18 rotates, the rotational energy transfers through one or more planetary gear sets 20 (e.g., 1, 2, 3, 4, 5, or more) within a gear housing 22. The planetary gear sets 20 then transfer the rotational energy to a rack and pinion system 24 within a rack and pinion housing 26. The rack and pinion system 24 then actuates the flow control mechanism 14 (e.g., rotates the flow control mechanism 14 within the tubular 12). As will be explained below, the rack and pinion system 24 includes a biasing element 28 (e.g., one or more springs) within a housing 30 (e.g., a spring housing) that biases the rack and pinion system 24 to open or close the flow control mechanism 14. In certain embodiments, the biasing element 28 may include a spring, one or more permanent magnets (e.g., a pair of opposing magnets), one or more electromagnets, or any combination thereof.

In order to open or close the flow control system 10 without the actuator 16, the flow control system 10 includes a failsafe device 32. In operation, the failsafe device 32 enables the flow control system 10 to open or close the flow control mechanism 14 quickly (e.g., an emergency). In some embodiments, the failsafe device 32 may be a solenoid actuator that mechanically releases the planetary gear sets 20, or in other words enables the planetary gear sets 20 to freely rotate without the actuator 16. When the planetary gears sets 20 are able to freely rotate, the spring 28 expands and drives the rack and pinion system 24, opening or closing the flow control mechanism 14.

In some embodiments, the flow control system 10 may control both the failsafe device 32 and the actuator 16 with a controller 34. For example, the controller 34 may include a processor 36 and a memory 38. The processor 36 may include a single processor or two or more redundant processors, such as triple redundant processors for control of the flow control system 10. The memory 38 may include volatile and/or non-volatile memory. For example, the memory 38 may include one or more hard drives, flash memory, read-only memory, random access memory, or any combination thereof. The memory 38 may store one or more sets of instructions for execution by the processor 36. The instructions may control when the actuator 16 opens and closes the flow control mechanism 14 or when the failsafe device 32 actuates to open or close the flow control mechanism 14 in an emergency.

Figure 2:
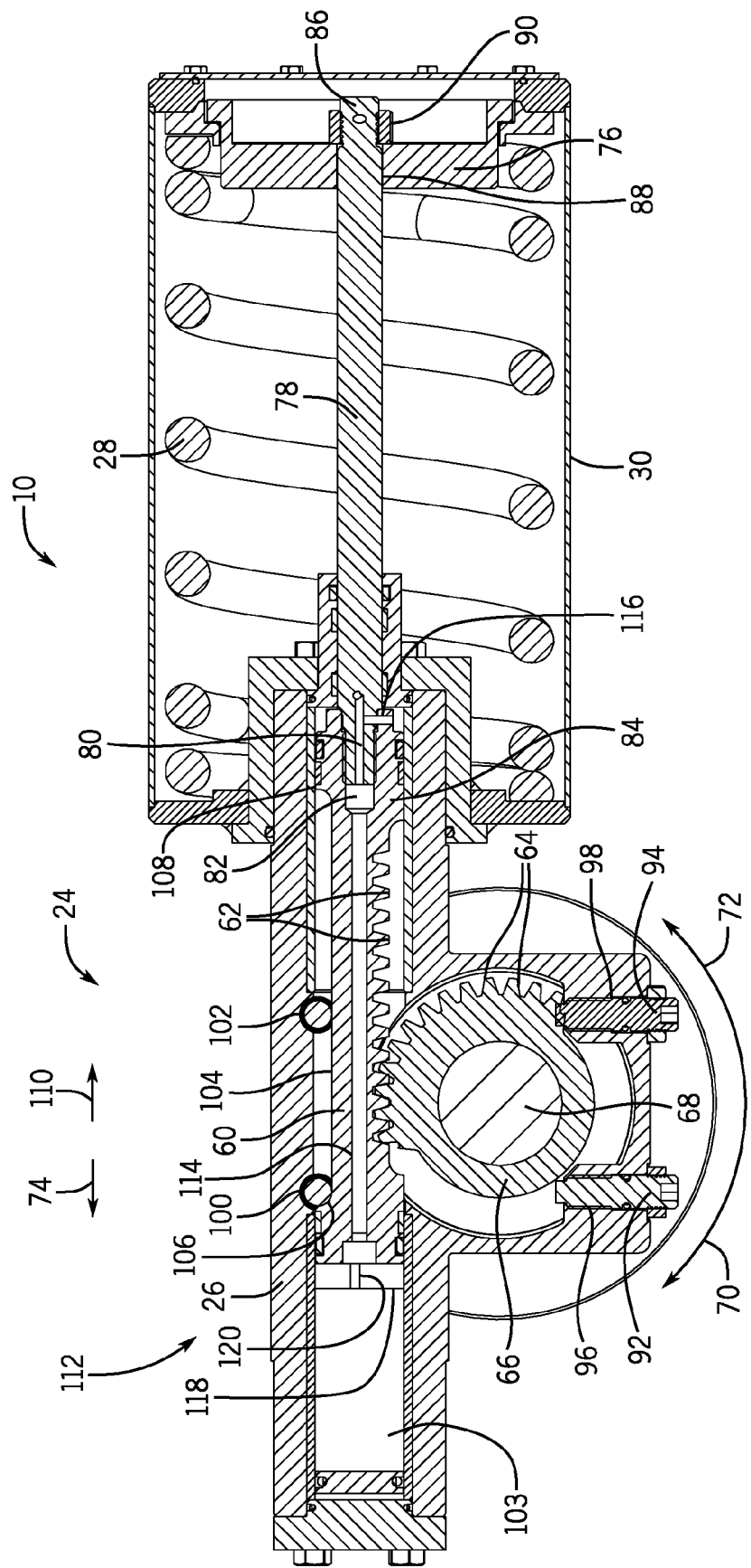
FIG. 2 is a cross-sectional view of an embodiment of the flow control system along line 2-2 of FIG. 1.

FIG. 2 is a cross-sectional view of an embodiment of the flow control system 10 along line 2-2 of FIG. 1. More specifically, FIG. 2 is a cross-sectional view of an embodiment of the rack and pinion system 24 within the flow control system 10. As illustrated, the rack and pinion system 24 includes a rack and pinion housing 26 that contains a rack 60 with teeth 62 that engage corresponding teeth 64 on a pinion 66 (e.g., gear). As explained above, the rack and pinion system 24 receives rotational energy from the input shaft 18 through planetary gear sets 20 within the gear housing 22. The planetary gear sets 20 couple to the pinion 66 and rotate the pinion 66 in either circumferential direction 70 or 72. As the pinion 66 rotates, the pinion 66 rotates a shaft 68 that opens and closes the flow control mechanism 14, while simultaneously driving the rack 60 axially to create potential energy with the spring 28 or other biasing element (e.g., permanent magnets, electromagnets, springs, or a combination thereof). As illustrated, the rack 60 couples to a plate 76 within the spring housing 30. In order to compress the spring 28, the rack 60 may couple to the plate 76 with a rod 78. For example, a first end 80 of the rod 78 may threadingly couple to an aperture 82 in a first end 84 of the rack 60, while a second end 86 of the rod 76 may extend through an aperture 88 in the plate 76 enabling the rod 76 to couple to the plate 76 with a nut 90. In some embodiments, the rack 60 may extend into the spring housing 30 and couple to the plate 76 directly, or the rod 76 may threadingly couple directly to the plate 76. In operation, as the pinion 66 rotates in direction 72, the pinion 66 axially moves the rack 60 in direction 74. As the rack 60 moves in direction 74, the rack 60 compresses the spring 28 with the plate 76 creating potential energy. As will be explained in detail below, compressing the spring 28 creates potential energy that the flow control system 10 uses to close the flow control mechanism 14 when the failsafe device is actuated.

In some embodiments, the rack and pinion system 24 may include one or more end stops 92, 94 (e.g., screws, pins, etc.) that control how far the flow control mechanism 14 opens and closes by controlling how far the pinion 66 rotates. The end stops 92 may thread into the rack and pinion housing 26 through respective apertures 96, 98. In operation, the end stops 92, 94 may thread further into or further out of the rack and pinion housing 26 to reduce or increase the amount of rotation of the pinion 66. In some embodiments, the end stops 92, 94 may also cushion or reduce the impact of the pinion 66, when the potential energy of the spring 28 is released. For example, the end stops 92, 94 may be made out of a soft metal, plastic, and/or rubber that absorb the impact of the teeth 64.

The rack and pinion system 24 may also include bearings 100, 102 that facilitate movement of the rack 60 within a cavity 103 of the rack and pinion housing 26. As illustrated, the bearings 100, 102 contact a groove 104 on the rack 60 enabling the rack 60 to slide back and forth between groove ends 106 and 108 as rack 60 moves in axial directions 74, 110.

In certain embodiments, the flow control system 10 may include a damper system 112 within the rack and pinion housing 26. For example, the damper system 112 may be a fluid based damper system that uses fluid within the cavity 103 to cushion and/or slow the movement of the rack 60. As illustrated, the damper system 112 includes an aperture 114 through the rack 60 that fluidly communicates with an aperture 116. In operation, as the rack 60 moves in direction 110, fluid in the cavity 103 is forced through the aperture 116 and into the aperture 114. As the fluid flows through the rack 60, the fluid contacts a plate 118 with one or more apertures 120 (e.g., 1, 2, 3, 4, 5, or more). The apertures 120 may restrict the flow of fluid through the rack 60, thus cushioning and/or slowing movement of the rack 60 with fluid in the cavity 103. In some embodiments, the damper system 112 may include a plurality of interchangeable end caps 120 with differently sized apertures 118 to control how quickly fluid flows through the rack 60 and therefore how quickly the rack 60 is able to move. Moreover, in some embodiments the damper system 112 may include springs within the cavity 103 (e.g., on opposite sides of the rack 60) to dampen the impact of the rack 60 as the rack 60 moves within the rack and pinion housing 26. The damper system 112 may use the springs with or without fluid in the cavity 103 to dampen the rack 60.

Figure 3:
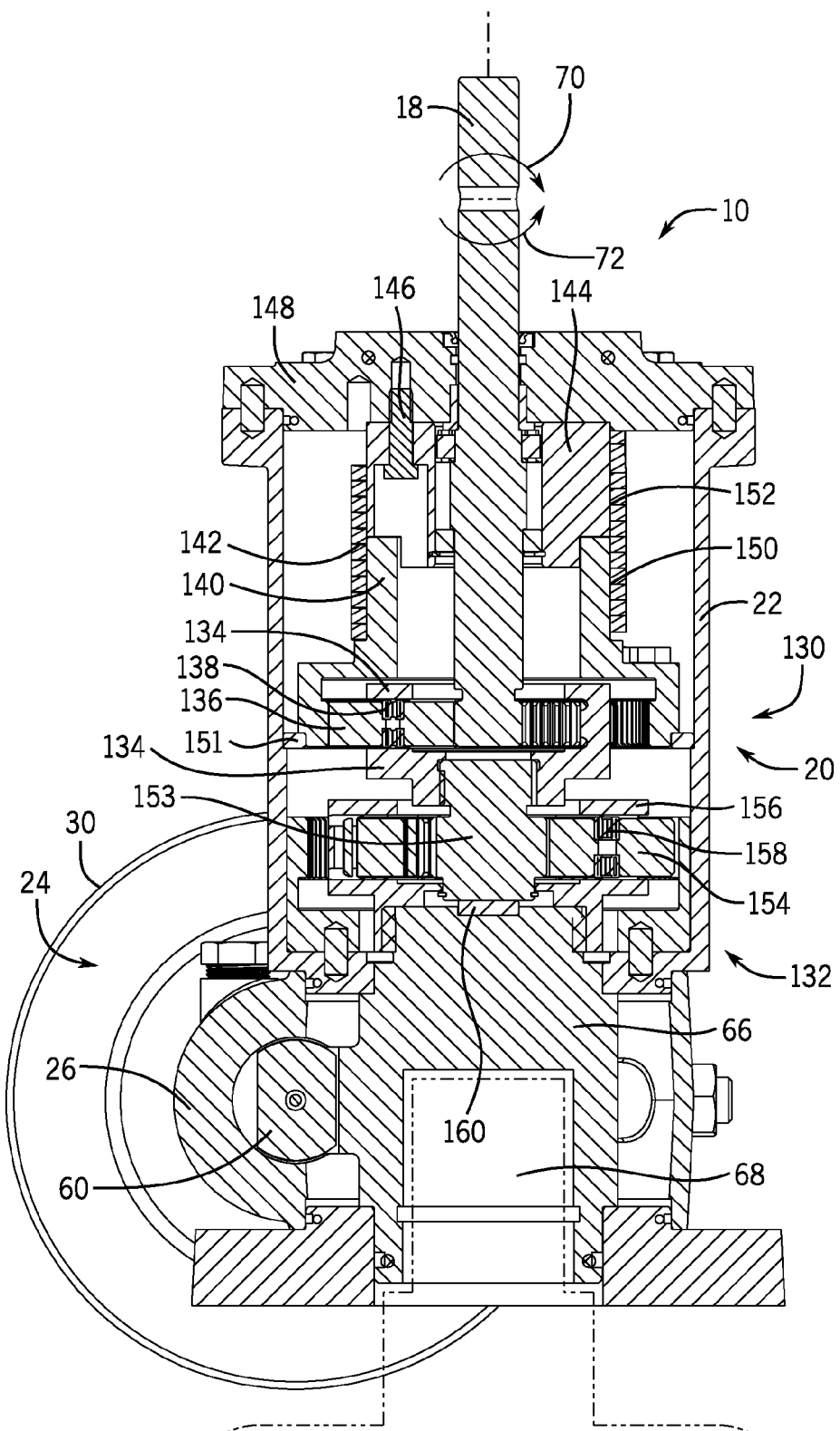
FIG. 3 is a cross-sectional view of an embodiment of the flow control system along line 3-3 of FIG. 1.

FIG. 3 is a cross-sectional view of an embodiment of the flow control system 10 along line 3-3 of FIG. 1. As explained above, the flow control system 10 actuates the flow control mechanism 14 by rotating the input shaft 18 with the actuator 16 (seen in FIG. 1). As the input shaft 18 rotates, the rotational energy is transferred to planetary gear sets 20 within the gear housing 22. The planetary gear sets 20 then transfer the rotational energy to the rack and pinion system 24. The rack and pinion system 24 then actuates the flow control mechanism 14 (e.g., rotates the flow control mechanism 14 within the tubular 12 seen in FIG. 1). As illustrated, the flow control system 10 may have multiple planetary gear sets 20 in series within the gear housing 22. For example, the flow control system 10 may include a first planetary gear set 130 coupled to a second planetary gear set 132. However, in certain embodiments there may be a different number of planetary gear sets (e.g., 1, 2, 3, 4, 5, or more). In operation, these planetary gear sets 20 change the gear ratio, and thus the torque acting on the rack and pinion system 24.

The first planetary gear set 130 includes a first carrier 134 that couples to one or more planetary gears 136 (e.g., 1, 2, 3, 4, 5, or more) with bearings or shafts 138. The planetary gears 136 in turn couple to a ring gear 140 and to the input shaft 18 (e.g., sun gear). As explained above, the actuator 16 rotates the input shaft 18, enabling the input shaft 18 (e.g., sun gear) to rotate the planetary gears 136. While the input shaft 18 and planetary gears 136 are capable of rotating, the ring gear 140 is held in place with a rotational control structure (e.g., wrap spring 1421 that couples the ring gear 140 to a hub 144 (e.g., brake hub). The hub 144 in turn is held in place (e.g., stationary structure) with one or more connectors 146 (e.g., threaded connector, screw, pin, bolts, etc.) that couple the hub 144 to a gear housing cover 148. More specifically, the wrap spring 142 compressively wraps around an exterior surface 150 of the ring gear 140 and the exterior surface 152 of the hub 144 to block rotation of the ring gear 140. As will be explained in detail below, the wrap spring 142 remains in place until the failsafe device 32 actuates (e.g., e.g., loosens, uncouples) the wrap spring 142, enabling the ring gear 140 to rotate. In some embodiments, the flow control system 10 may include the bearings 151 that support and facilitate rotation of the ring gear 140 when the wrap spring 142 uncouples (e.g., loosens) from the ring gear 140.

In operation, the first planetary gear set 130 transfers rotational energy from the input shaft 18 to the second planetary gear set 132. More specifically, as the input shaft 18 rotates the planetary gears 136, the planetary gears 136 rotate the carrier 134. The carrier 134 then transfers the rotational energy to a shaft 153 (e.g., sun gear) of the second planetary gear set 132. The shaft 153 then rotates the planetary gears 154. As the planetary gears 154 rotate about the shaft 153, the planetary gears 154 rotate the carrier 156 through the bearings or shafts 158. The carrier 156 then rotates the pinion 66 to actuate the flow control mechanism 14. In some embodiments, the pinion 66 supports a bearing 160 that facilitates and enables rotation of the shaft 153 with respect to the pinion 66.

Figure 4:
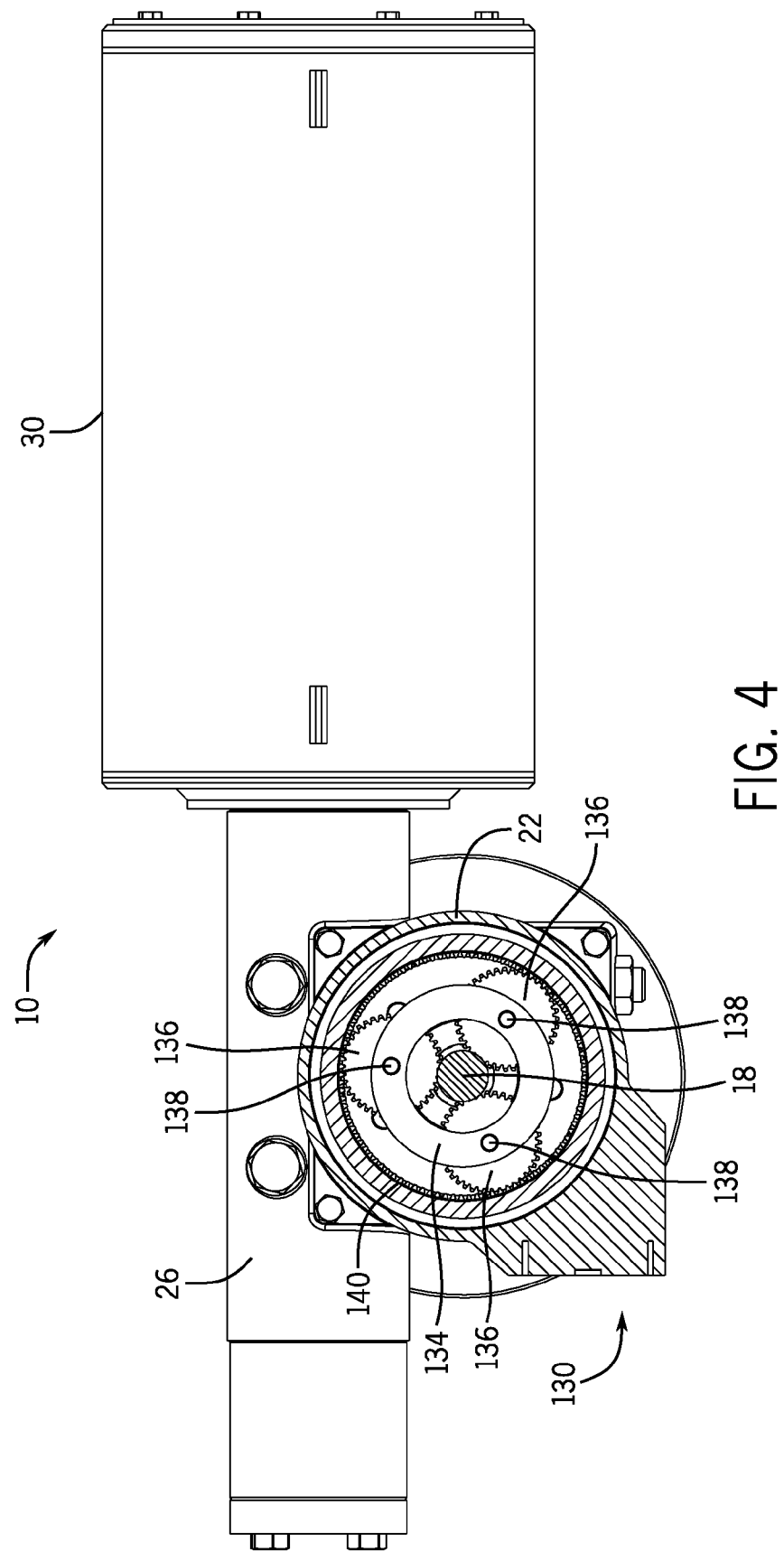
FIG. 4 is a cross-sectional view of an embodiment of the flow control system along line 4-4 of FIG. 1.

FIG. 4 is a cross-sectional view of an embodiment of the flow control system 10 along line 4-4 of FIG. 1 illustrating the first planetary gear set 130. As explained above, the first planetary gear set 130 includes the first carrier 134 coupled to one or more planetary gears 136 (e.g., 1, 2, 3, 4, 5, or more) with bearings or shafts 138. The planetary gears 136 in turn couple to a ring gear 140 and to the input shaft 18 (e.g., sun gear). In operation, the input shaft 18 rotates the planetary gears 136, and by extension the carrier 134. As explained above, the ring gear 140 is held in place (i.e., stationary) with a wrap spring 142 (seen in FIG. 3) that couples the ring gear 140 to a hub 144 (e.g., brake hub). The wrap spring 142 remains in place until the failsafe device 32 actuates (e.g., uncouples, loosens) the wrap spring 142 enabling the ring gear 140 to rotate.

FIG. 5 is a partial perspective view of an embodiment of a flow control system 10 with the failsafe device 32. As explained above, when the wrap spring 142 releases (e.g., uncouples) the ring gear 140, the flow control system 10 is able to open or close the flow control mechanism 14 without operation or use of the actuator 16 (e.g., in an emergency or other quick-close situation). More specifically, when wrap spring 142 releases the ring gear 140, the first and second gear sets 130, 132 can rotate when the input shaft 18 is stationary (i.e., without input from the actuator 16). The ability of the first and second gear sets 130, and 132 to freely rotate releases the potential energy stored in the spring 28. In other words, when the spring 28 releases its potential energy in axial direction 110, the spring 28 drives the rack 60 in axial direction 110 as the first and second planetary gear sets 130, 132 rotate. Accordingly, as the rack 60 moves in axial direction 110, the rack teeth 62 are able to engage the pinion teeth 64 and rotate the pinion 66 in direction 70. The rotation of the pinion 66 then closes the flow control mechanism 14.

In some embodiments, the failsafe device 32 includes a solenoid actuator that drives a piston or shaft 180 into contact with a tang or prong 182 on the wrap spring 142, to loosen the wrap spring 142. As illustrated, the wrap spring 142 includes a first end 184 and a second end 186. The second end 186 of the wrap spring 142 couples to the hub 144 or to the cover 148 to block movement of the second end 186 of the wrap spring 142. Accordingly, when the piston 180 contacts the tang or prong 182 of the first end 184, the piston 180 circumferentially expands the wrap spring 142 uncoupling the wrap spring 142 from the ring gear 140. Similarly, when the failsafe device 32 retracts the piston 180, the wrap spring 142 contracts and couples the ring gear 140 to the hub 144 blocking rotation of the ring gear 140. In this way, the failsafe device 32 is able to open or close the flow control mechanism 14 without operation of the actuator 16.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a flow control system, comprising:
a flow control mechanism configured to control a flow of fluid through a fluid passage;
a first planetary gear set;
a rack and pinion system, wherein the flow control system is configured to transfer motion to move the flow control mechanism via the first planetary gear set and the rack and pinion system;
a biasing element coupled to the rack and pinion system, wherein the biasing element is configured to store potential energy as the flow control mechanism transitions from a closed position to an open position or the open position to the closed position;
a rotational control structure configured to selectively move between first and second positions to enable and disable rotation of at least one gear of the first planetary gear set, wherein the rotational control structure rotationally uncouples the at least one gear from a stationary structure in the first position, and the rotational control structure rotationally couples the at least one gear to the stationary structure in the second position; and
a failsafe device configured actuate the rotational control structure to release the potential energy stored in the biasing element to open or close the flow control mechanism.

2. The system of claim 1, wherein the rotational control structure is configured to selectively change the first planetary gear set between a first rotational configuration and a second rotational configuration, the first rotational configuration enables actuation of the flow control mechanism with an actuator, and the second rotational configuration enables actuation of the flow control mechanism with the potential energy stored in the biasing element independent from the actuator.

3. The system of claim 2, wherein the first planetary gear set comprises a first ring gear, at least one first planetary gear, a first carrier, and a first sun gear.

4. The system of claim 3, comprising a second planetary gear set coupled to the first planetary gear set.

5. The system of claim 3, wherein the rotational control structure comprises a wrap spring coupled to the first ring gear and configured to selectively enable and block rotation of the first ring gear to change the first planetary gear set between the first rotational configuration and the second rotational configuration.

6. The system of claim 5, wherein the failsafe device is configured to open or close the flow control mechanism without an actuator by uncoupling the wrap spring from the first ring gear to enable the first ring gear to rotate and release the potential energy of the biasing element.

7. The system of claim 1, wherein the failsafe device comprises a solenoid actuator configured to expand a wrap spring of the rotational control structure.

8. The system of claim 1, wherein the rotational control structure, the stationary structure, and the at least one gear are disposed along a common axis.

9. The system of claim 1, comprising an actuator configured to move the flow control mechanism via the first planetary gear set and the rack and pinion system, and wherein a controller couples to the failsafe device and is configured to actuate the failsafe device.

10. The system of claim 1, wherein the biasing element comprises a spring.

11. The system of claim 1, wherein the biasing element comprises magnets.

12. The system of claim 1, wherein the rack and pinion system comprises a rack coupled to a plate, and wherein the plate is configured to compress the biasing element.

13. The system of claim 1, wherein the first planetary gear set comprises a first ring gear disposed about at least one first planetary gear and a first sun gear, and the at least one gear comprises the first ring gear.

14. A system, comprising:
a flow control system, comprising:
a flow control mechanism configured to control a flow of fluid through a fluid passage;
a planetary gear set coupled to the flow control mechanism, the planetary gear set, comprising a ring gear, a sun gear, and at least one planetary gear coupled to the ring gear and the sun gear;
a spring coupled to the ring gear and configured to block movement of the ring gear; and
a failsafe device coupled to the spring and configured to uncouple the spring from the ring gear to open or close the flow control mechanism.

15. The system of claim 14, comprising an actuator configured to open and close the flow control mechanism by rotating the sun gear.

16. The system of claim 15, comprising a rack and pinion system coupled the planetary gear set and configured to transfer the rotation of the planetary gear set to the flow control mechanism.

17. The system of claim 15, comprising a controller configured to control operation of the actuator and the failsafe device to open and close the flow control mechanism.

18. A system, comprising:
a flow control system, comprising:
a flow control mechanism configured to control a flow of fluid through a fluid passage;
a first planetary gear set;
a rotational control structure coupled to at least one gear of the first planetary gear set, wherein the rotational control structure is configured to selectively change the first planetary gear set between a first rotational configuration and a second rotational configuration by moving between first and second positions, the first rotational configuration enables actuation of the flow control mechanism with a first actuator, and the second rotational configuration enables actuation of the flow control mechanism with a second actuator independent from the first actuator; and
a failsafe device configured to actuate the rotational control structure to open or close the flow control mechanism via the second actuator.

19. The system of claim 18, comprising a controller coupled to the failsafe device and configured to control operation of the failsafe device to open or close the flow control mechanism.

20. The system of claim 18, wherein the second actuator comprises a biasing element configured to store potential energy to open or close the flow control mechanism.

21. The system of claim 20, wherein the biasing element comprises a spring coupled to a rack and pinion system, and wherein the spring is configured to drive the rack and pinion system to open or close the flow control mechanism, upon release of the potential energy stored by the spring.

22. The system of claim 18, wherein the rotational control structure is configured to selectively enable and disable rotation of the at least one gear of the first planetary gear set when changing between the first and second rotational configurations, and wherein the first planetary gear set comprises a first ring gear, at least one first planetary gear, and a first sun gear.

23. The system of claim 22, wherein the at least one gear comprises the first ring gear.

24. The system of claim 18, wherein the rotational control structure comprises a wrap spring.

* * * * *